United States Patent

Kim

[11] Patent Number: 5,931,010
[45] Date of Patent: Aug. 3, 1999

[54] METHOD AND APPARATUS FOR CONTROLLING A TEMPERATURE OF A COOKED FOOD CHILLING CHAMBER IN A REFRIGERATOR

[75] Inventor: Jee-Yong Kim, Seoul, Rep. of Korea

[73] Assignee: Daewoo Electronics Co., Ltd., Seoul, Rep. of Korea

[21] Appl. No.: 08/955,307

[22] Filed: Oct. 21, 1997

[30] Foreign Application Priority Data

Oct. 21, 1996 [KR] Rep. of Korea ............. 96-47280
Oct. 21, 1996 [KR] Rep. of Korea ............. 96-47281

[51] Int. Cl.$^6$ .................................. F25D 17/08
[52] U.S. Cl. .................. 62/157; 62/126; 62/186; 62/163; 62/229
[58] Field of Search .............. 62/157, 231, 186, 62/187, 163, 158, 408, 203, 208, 209, 126, 127, 130, 180, 229

[56] References Cited

U.S. PATENT DOCUMENTS

| | | | |
|---|---|---|---|
| 3,759,053 | 9/1973 | Swaneck, Jr. ............ | 62/157 |
| 4,358,932 | 11/1982 | Helfrich, Jr. ............ | 62/186 X |
| 4,389,854 | 6/1983 | Ogita et al. ............ | 62/157 |
| 4,697,429 | 10/1987 | Chandler et al. ............ | 62/231 X |
| 5,263,332 | 11/1993 | Park ............ | 62/157 |

*Primary Examiner*—Harry B. Tanner
*Attorney, Agent, or Firm*—Pillsbury Madison & Sutro LLP

[57] ABSTRACT

A method and an apparatus for controlling a temperature of a cooked food chilling chamber for quick refrigerating cooked food in a refrigerator, is disclosed. A system control section is provided with a load sensing signal of cook chill chamber from a cook chill chamber load sensing section in response to an operating of cook chill mode selecting key by a user. The system control section determines an operating time of a cook chill mode by controlling both a cool air supplying section and a cool air amount controlling section. The system control section stops the cook chill mode by controlling both the cool air supplying section and the cool air amount controlling section in accordance with a cook chill mode stopping key which is operated by the user. Accordingly, an inside temperature of the cook chill chamber is maintained within the range of the most appropriate temperature for keeping the cooked food fresh.

9 Claims, 4 Drawing Sheets

METHOD AND APPARATUS FOR CONTROLLING A TEMPERATURE OF A COOKED FOOD CHILLING CHAMBER IN A REFRIGERATOR

BACKGROUND OF THE INVENTION

1. Field of the Invention

The present invention relates to a method and an apparatus for controlling a temperature of a cooked food chilling chamber (hereinafter, referred to as "cook chill chamber") for quickly refrigerating cooked food in a refrigerator.

2. Description of the Prior Art

Recently, a variety of electronic products tends to be multifunctional and to be multipurpose in order to fulfill various needs of consumers. Accordingly, in refrigerators, various products which are designed for the convenience and the multiple purposes of consumers, e.g., those refrigerators which have an improved refrigerating efficiency by increasing the number of coolers of a refrigerating compartment or those refrigerators which consumes less electric power, are widely used. Especially, various methods by which the freezing efficiency or the refrigerating efficiency of the refrigerator is maximized while the electric power is minimally consumed, have been presented.

For example, U.S. Pat. No. 5,263,332 discloses the method for improving the refrigerating efficiency by promptly restoring after a closing of the refrigerator door the temperature in the refrigerating compartment which has risen by external air flowing into the refrigerating compartment during an opening of the refrigerator door. According to the method, both a point of time of a door opening and a point of time of a door closing are detected in order to calculate a time difference between a door opening and a door closing, i.e., a door open time, and the operations of a compressor and of a fan are controlled in order to provide cool air to the refrigerating compartment. Then, on the basis of the door open time, the inside temperature of the refrigerating compartment is reset to a temperature which is lower than an initially-set temperature. When the reset temperature is established, the driving of the compressor and the fan are controlled until the temperature inside the refrigerating compartment decreases to the reset temperature.

When cooked food is contained in the refrigerating compartment, an inside temperature of the refrigerating compartment rises. In such a cases, the heat of the cooked food quickens the spoiling of the food in the refrigerator and causes more electric consumption. However, it is inconvenient for a user to cool the cooked food outside of the refrigerating compartment or the freezing compartment in order to avoid the above situation. Furthermore, the above method is not a good method for maintaining the taste of the cooked food. According to food processing studies, when food which is newly cooked is quickly freezed and is kept in the refrigerating compartment, the taste of the food which is newly cooked is well maintained and the cooked food is kept in a fresh state for many hours. However, examples where the above principle of food processing studies is applied to refrigerators have not been yet disclosed.

Therefore, in the case of cooked food, it is essential to develop refrigerators which keep the taste of cooked food in fresh condition for a long time.

SUMMARY OF THE INVENTION

Therefore, it is a first object of the present invention to provide a method for automatically operating and/or stopping a cooked food chilling mode of a refrigerator in response to an inside temperature a cook chill chamber or to a user's selection, and for determining a cooked food chilling mode operating time according to a load amount.

It is a second object of the present invention to provide an apparatus for automatically operating and/or stopping a cooked food chilling mode of a refrigerator in response to an inside temperature of a cook chill chamber or to a user's selection, and for determining a cooked food chilling mode operating time according to a load amount.

In order to achieve the above first object, the present invention provides a method for controlling a temperature of a cook chill chamber in a refrigerator, which comprises:

(i) judging whether or not a present condition is a cook chill mode setting condition;

(ii) determining a cook chill mode operating time by sensing a load amount of a cook chill chamber when it is judged in step (i) that the present condition is the cook chill mode setting condition;

(iii) operating the cook chill mode by controlling a cool air supplying means and a cool air amount control means during the cook chill mode operating time determined in step (ii);

(iv) judging whether or not a present condition is a cook chill mode stopping condition; and (v) stopping the cook chill mode by controlling said cool air supplying means and said cool air amount control means when it is judged in step (iv) that the present condition is the cook chill mode stopping condition.

In order to achieve the above second object, the present invention provides an apparatus for controlling a temperature of a cook chill chamber in a refrigerator, which comprises:

means for supplying a cool air to a refrigerating compartment and a cook chill chamber;

means for controlling a cool air amount which is supplied to the refrigerating compartment and the cook chill chamber;

means for sensing an inside temperature of the cook chill chamber and generating a sensed cook chill chamber inside temperature signal; and system control means for comparing the sensed cook chill chamber inside temperature signal from said cook chill chamber inside temperature sensing means with a cook chill chamber reference temperature and operating or stopping a cook chill mode by controlling both said cool air supplying means and said cool air amount control means in response to the compared result.

In the method and apparatus for controlling a temperature of a cook chill chamber in a refrigerator according to the present invention, the cook chill mode is manually or automatically operated or stopped in accordance with a key input signal from a user or with a rise or a drop in the temperature inside the cook chill chamber. Also, the operating time of the cook chill chamber is automatically determined in accordance with the load amount of the cook chill chamber.

Accordingly, the temperature inside the cook chill chamber is always maintained at an appropriate level to maintain the taste of food which is newly cooked. As a result, the cooked food is kept in a fresh state for many hours.

BRIEF DESCRIPTION OF THE DRAWINGS

The above objects and other advantage of the present invention will become more apparent by describing in detail a preferred embodiment thereof with reference to the attached drawings, in which.

DESCRIPTION OF THE PREFERRED EMBODIMENTS

A description will be given below in detail with reference to the accompanying drawings to a configuration and an operation of a method and an apparatus for controlling a temperature of a cook chill chamber in a refrigerator according to an embodiment of the present invention.

Figure 1:
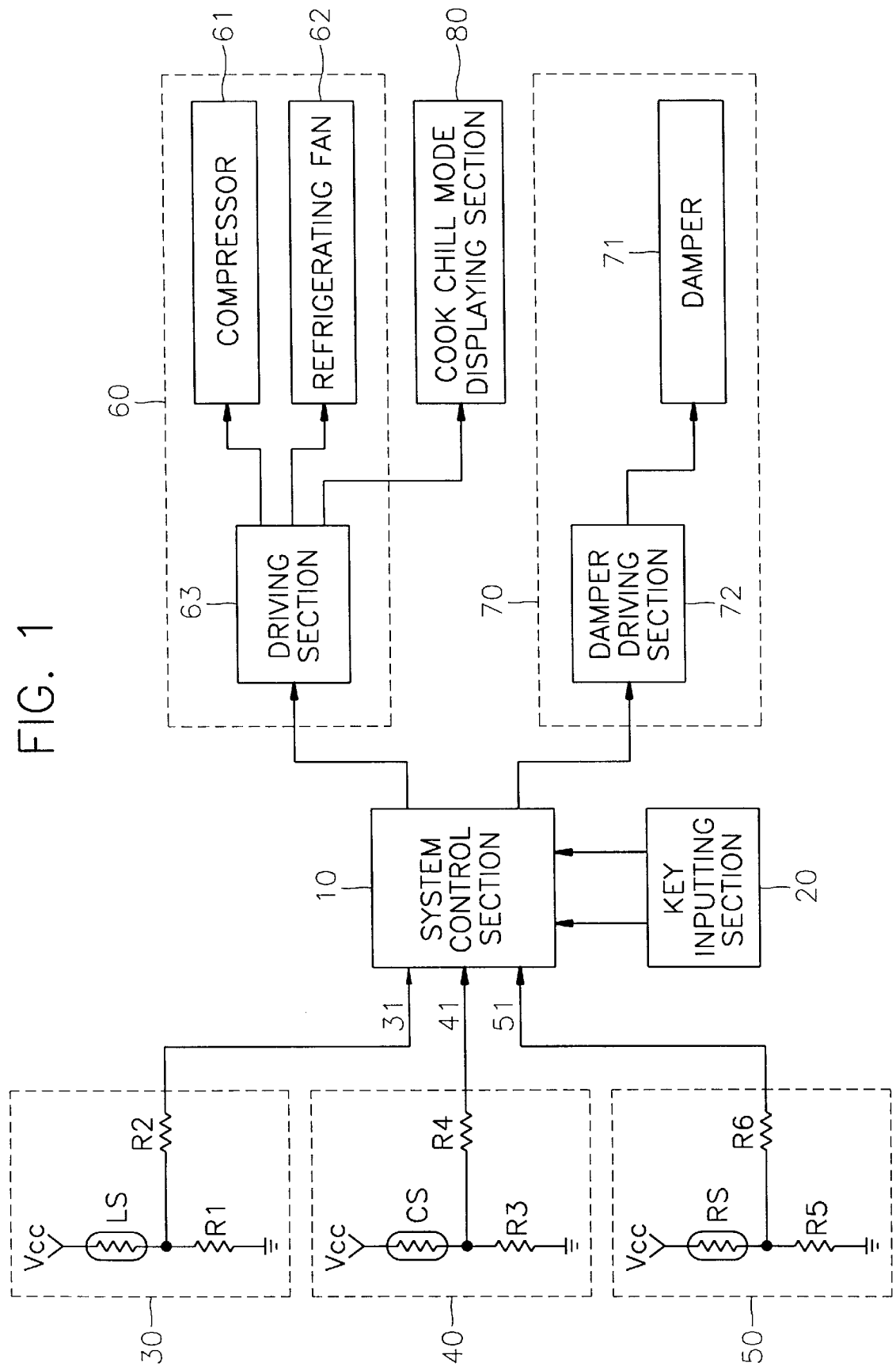
FIG. 1 is a block diagram for showing the circuit configuration of an apparatus for controlling a temperature of a cook chill chamber in a refrigerator according to the present invention.

FIG. 1 is a block diagram for showing the circuit configuration of an apparatus for controlling a temperature of a cook chill chamber in a refrigerator according to an embodiment of the present invention. As shown in FIG. 1, the temperature control apparatus comprises a system control section 10, a key inputting section 20, a cook chill chamber load sensing section 30, a cook chill chamber temperature sensing section 40, a refrigerating compartment temperature sensing section 50, a cool air supplying section 60, a cool air amount control section 70 and a cook chill mode displaying section 80.

System control section 10 controls the overall operation of the cook chill chamber temperature control apparatus while inputting signals which are supplied from key inputting section 20 and a plurality of sensing sections.

Key inputting section 20 provides a cook chill mode selecting key signal 21a and/or a cook chill mode stopping key signal 21b to system control means 10 in response to a user's operation.

Cook chill chamber load sensing section 30 comprises a load sensor LS whose resistance value is varied in accordance with a variation of load weight, a first resistor R1 and a second resistor R2. Cook chill chamber load sensing section 30 senses the amount of food which is put into cook chill chamber and provides a cook chill chamber load amount sensing signal 31 to system control means 10.

Cook chill chamber temperature sensing section 40 comprises a third resistor R3, a fourth resistor R4 and a first temperature sensor CS. Cook chill chamber temperature sensing section 40 senses the inside temperature of cook chill chamber and provides a cook chill chamber inside temperature signal 41 to system control section 10.

Refrigerating compartment temperature sensing section 50 comprises a fifth resistor R5, a sixth resistor R6 and a second temperature sensor RS. Refrigerating compartment temperature sensing section 50 senses the inside temperature of a refrigerating compartment and provides a refrigerating compartment inside temperature signal 51 to system control section 10.

Cool air supplying section 60 comprises a compressor 61, a refrigerating fan 62 and a driving section 63. Compressor 61 compresses coolant. Refrigerating fan 62 operates a flow of cool air. Driving section 63 drives compressor 61 and refrigerating fan 62 in response to a control signal 11 from system control section 10. Cool air supplying section 60 supplies cool air into the refrigerating compartment and the cook chill chamber.

Cool air amount control section 70 comprises a damper 71 and a damper driving section 72. Damper 71 controls an opening and shutting rate of a cool air supplying passage which supplies the cool air into the refrigerating compartment and into the cook chill chamber. Damper driving section 72 drives the damper 71 in response to a control signal 12 from system control section 10.

System control section 10 is provided with cook chill mode selecting and/or stopping key signals 21a and 21b, cook chill chamber load amount sensing signal 31, cook chill chamber inside temperature signal 41 and refrigerating compartment inside temperature signal 51 from key inputting section 20, cook chill chamber load sensing section 30, cook chill chamber temperature sensing section 40 and refrigerating compartment temperature sensing section 50, respectively.

System control section 10 provides first and second control signals 11 and 12 to driving section 63 and damper driving section 72 respectively in response to cook chill mode selecting and stopping key signals 21a and 21b and cook chill chamber inside temperature signal 41 in order to control cool air supplying section 60 and cool air amount control section 70.

System control section 10 sets the refrigerating compartment to quick refrigerating mode when the cook chill mode is operated, and sets the refrigerating compartment to general refrigerating mode when the cook chill mode is stopped. In addition, system control section 10 sets refrigerating compartment to general refrigerating mode when it is judged that cook chill chamber inside temperature signal 51 is lower than a refrigerating compartment reference temperature.

Furthermore, system control section 10 sets a plurality of different cook chill chamber reference temperatures in order to operate and/or stop the cook chill mode. System control section 10 sets a plurality of different reference load amounts in order to determine the operating time of cook chill mode.

Cook chill mode displaying section 80 displays to the user the operating or stopping state of cook chill mode. Cook chill mode displaying section 80 is ON when the cook chill mode is being operated and is OFF when the cook chill mode is stopped.

A description will be made next of the procedure of the method which is performed by the apparatus shown in FIG. 1, in accordance with the flowcharts of FIGS. 2 to 4 for controlling a temperature of a cook chill chamber in a refrigerator.

Figure 2:
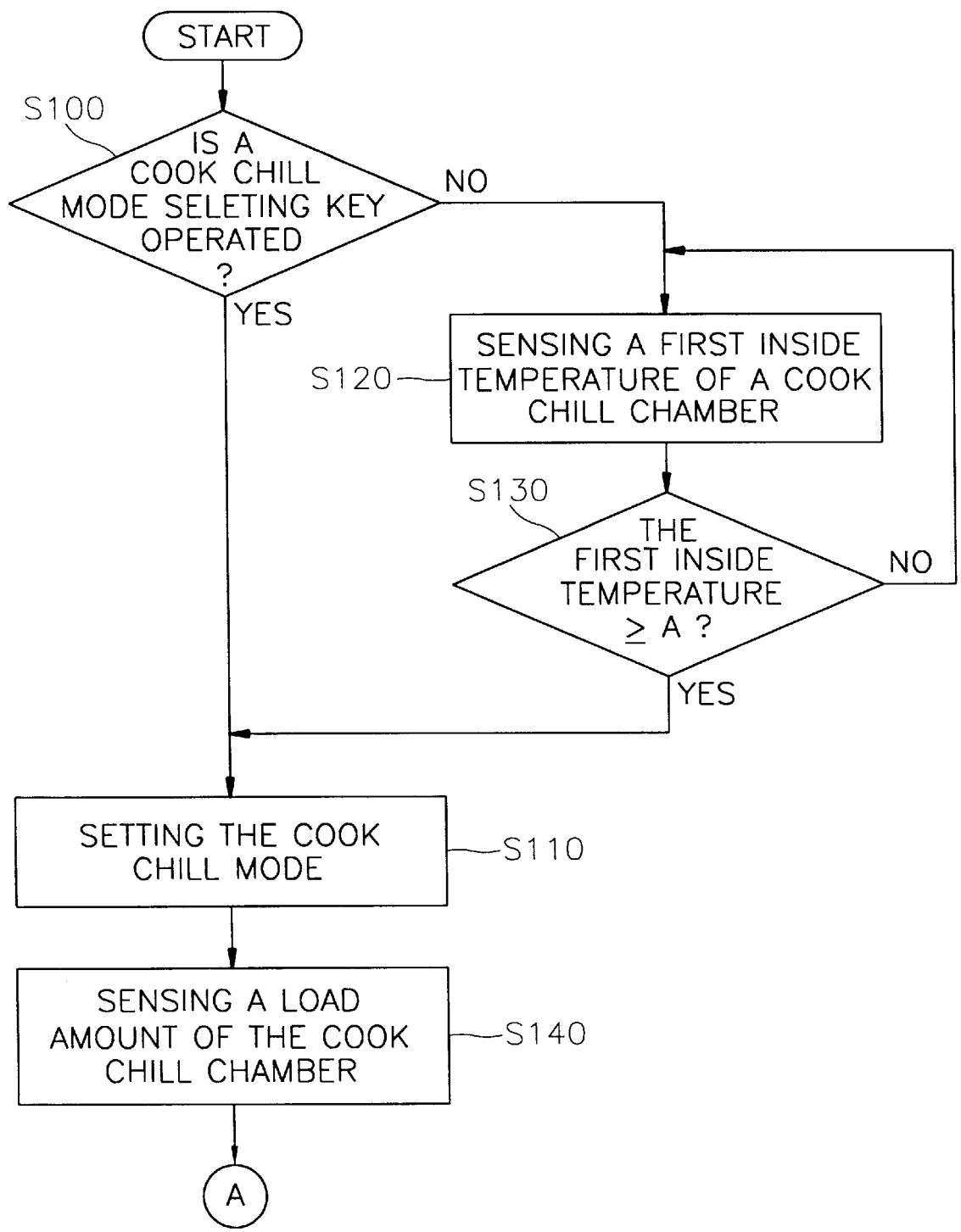
FIGS. 2 to 4 are a flowchart for illustrating a method for controlling a temperature of a cook chill chamber in a refrigerator by using the apparatus shown in FIG. 1.
Figure 3:
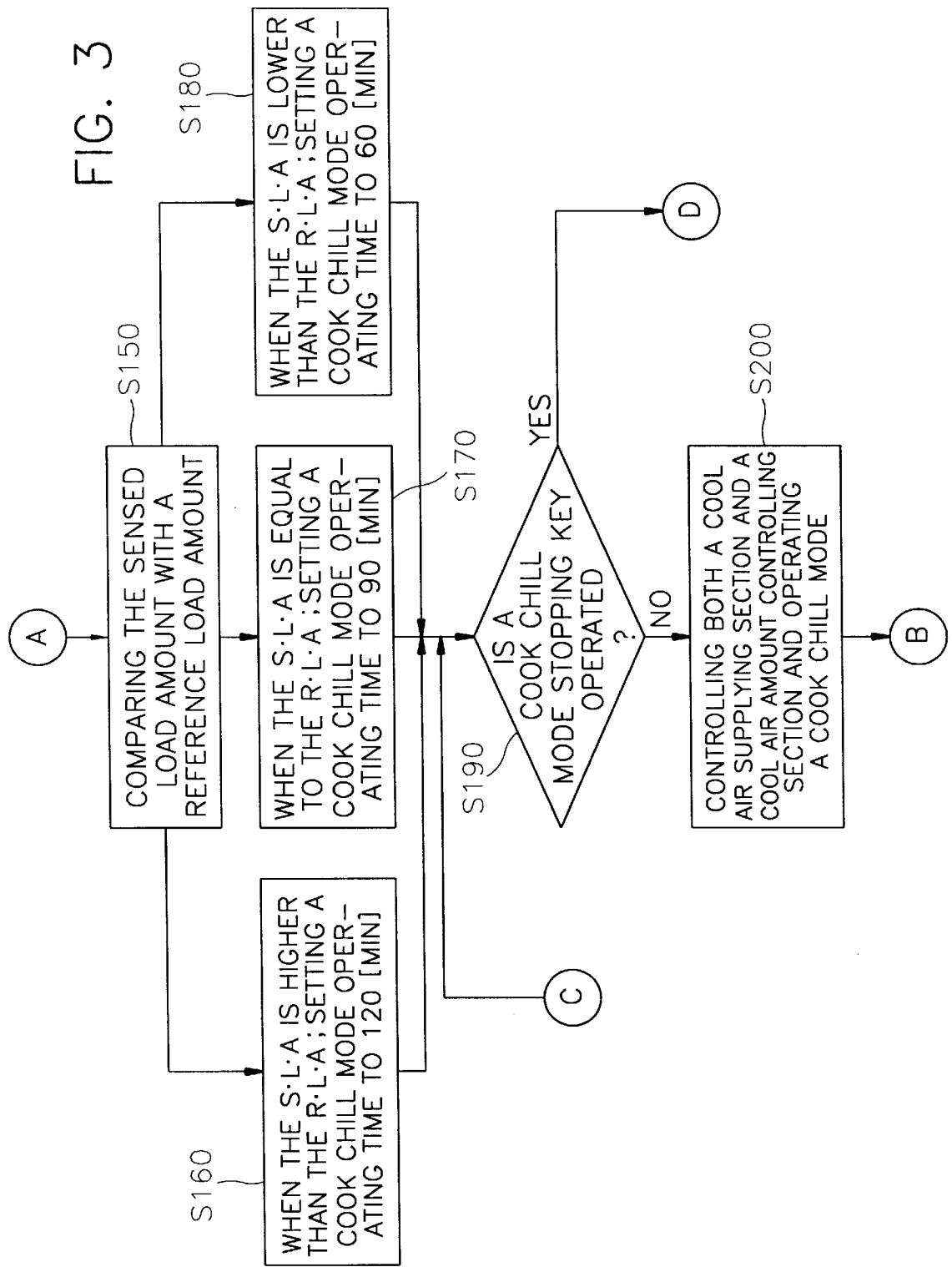
Figure 4:
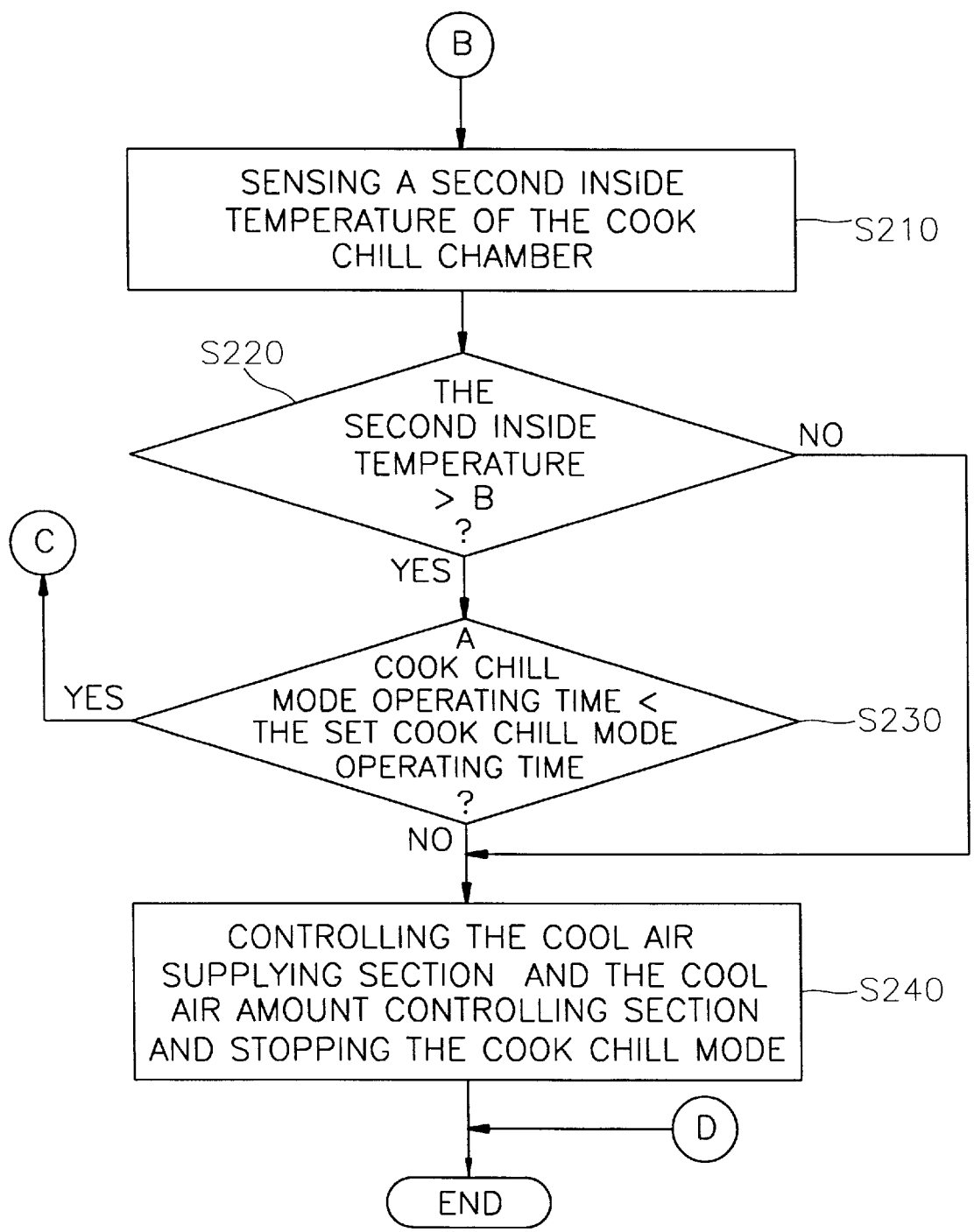

FIGS. 2 to 4 are flowcharts for illustrating a method for controlling a temperature of a cook chill chamber in a refrigerator by using the apparatus which is shown in FIG. 1. In the preferred embodiment of present invention, the cook chill chamber load amount is sets at 250 [gram] (refer to table). In the FIG. 3, "S.L.A" and "R.L.A" is a Sensed Load Amount and a Reference Load Amount, respectively.

TABLE

| A LOAD AMOUNT OF A COOK CHILL CHAMBER [g] | A COOK CHILL MODE OPERATING TIME [MIN] |
|---|---|
| LOAD ( 250 | 60 |
| LOAD = 250 | 90 |
| LOAD ) 250 | 120 |

After a user puts a cooked food into the cook chill chamber to preserve the cooked food, cook chill mode selecting key signal 21a is generated by the user's operation of key inputting section 20.

In step S100, system control section 10 determines whether or not a cook chill mode selecting key signal 21a is generated in accordance with the user's operation of the key inputting section 20.

When it is judged in step S100 that the cook chill mode selecting key signal 21a is provided from key inputting section 20, system control section 10 sets a cook chill mode(step S110).

When it is judged in step S100 that the cook chill mode selecting key signal 21a is not provided from the key inputting section 20, cook chill chamber temperature sensing section 40 senses an inside temperature of the cook chill chamber and provides a cook chill chamber inside temperature signal 41 to system control section 10(step S120).

In step S130, system control section 10 compares the inside temperature of the cook chill chamber which is provided from cook chill chamber temperature sensing section 40 with a first reference temperature A.

When it is judged in step S130 that the cook chill chamber inside temperature signal 41 is lower than the first reference temperature A, system control section 10 repeatedly executes the operating of comparing the cook chill chamber inside temperature signal 41 which is sensed in step S120 with the first reference temperature A.

When it is judged in step S130 that the cook chill chamber inside temperature signal 41 is higher than or equal to the first reference temperature A, system control section 10 sets the cook chill mode(step S110).

In step S110, when the cook chill mode is set, system control section 10 is provided with a load amount sensing signal 31 of the cook chill chamber from cook chill chamber load sensing section 30.

System control section 10 compares the cook chill chamber load amount sensing signal 31 which is provided in step S140 with a reference load amount of 250 g.(step S150).

When it is judged in step S150 that cook chill chamber load amount sensing signal 31 is higher than the reference load amount, system control section 10 sets cook chill mode operating time to 120 min.(step S160).

When it is judged in step S150 that cook chill chamber load amount sensing signal 31 is equal to the reference load amount, system control section 10 sets cook chill mode operating time to 90 min.(step S170).

When it is judged in step S150 that cook chill chamber load amount sensing signal 31 is lower than the reference load amount, system control section 10 sets cook chill mode operating time to 60 [min] (step S180).

In step S190, system control section 10 determines whether or not a cook chill mode stopping key signal 21b is generated in accordance with the user's operation of key inputting section 20.

When it is judged in step S190 that cook chill mode stopping key signal 21b is generated from key inputting section 20, system control section 10 stops and ends the cook chill mode which is set by steps S110 and S180(step S240).

When it is judged in step S190 that cook chill mode stopping key signal 21b is not generated from key inputting section 20, system control section 20 respectively provides first and second control signal 11 and 12 to driving section 63 of cool air supplying section 60 and damper driving section 72 of cool air amount control section 70 and operates the cook chill mode. Also, system control section 10 operates the quick refrigerating mode of the refrigerating compartment. Furthermore, cook chill mode displaying section 80 displays the cook chill mode which is operating(step S200).

Cook chill chamber temperature sensing section 40 senses the inside temperature of the cook chill chamber while the cook chill chamber is operating and provides cook chill chamber inside temperature signal 41 to system control section 10(step S210).

In step S220, system control section 10 compares cook chill chamber inside temperature signal 41 which is provided from cook chill chamber temperature sensing section 40 while the cook chill chamber is operating, with a second reference temperature B.

When it is judged in step S220 that cook chill chamber inside temperature signal 41 is lower than or equal to second reference temperature B, system control section 10 provides a control signal to each of driving section 63 of cool air supplying section 60 and damper driving section 72 of cool air amount control section 70 and stops the cook chill mode. Also, system control section 10 converts the quick refrigerating mode of the refrigerating compartment to a general refrigerating mode(step S240).

When it is judged in step S220 that cook chill chamber inside temperature signal 41 is higher than second reference temperature B, system control section 10 compares the operating time of cook chill mode with the cook chill mode operating time set by steps S160 and S180(step S230).

In step S230, when it is judged that the operating time of cook chill mode is lower than the set cook chill mode operating time, system control section 10 repeatedly executes from the step S190.

When it is judged in step S230 that the operating time of cook chill mode is higher than or equal to the set cook chill mode operating time, system control section 10 provides a control signal to driving section 63 of cool air supplying section 60 and damper driving section 72 of cool air amount control section 70 and stops the cook chill mode. Also, system control section 10 converts the quick refrigerating mode of the refrigerating compartment to the general refrigerating mode. Furthermore, cook chill mode displaying section 80 displays the cook chill mode which is stopped (step S240).

In the method and apparatus for controlling a temperature of a cook chill chamber in a refrigerator according to the present invention, the cook chill mode is manually or automatically operated or stopped in accordance with a key input signal from a user or a rise or a drop in the temperature inside the cook chill chamber. Also, the operating time of the cook chill chamber is automatically determined in accordance with the load amount of the cook chill chamber.

Accordingly, the temperature inside of the cook chill chamber is always maintained at an appropriate level to maintain the taste of food which is newly cooked. As a result, the cooked food is kept in a fresh state for many hours.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A method for controlling a temperature of a cooked food chilling chamber in a refrigerator, said method comprising the steps of:

(i) setting an operation mode of a refrigerator to a cook-chill mode when a user orders a start command of the cook-chill mode or when a measured inner temperature of a cook-chill chamber, which is periodically measured with a temperature sensing means, is higher than an upper-limit temperature;

(ii) when the operation mode is set as the cook-chill mode, measuring a load amount in the cook-chill chamber to be chilled and deciding an operation time of the cook-chill mode based on a look-up-table which relates data indicative of load amount with operation times of the cook-chill mode, where the operation time is proportional to the load amount; and (iii) implementing an operation of the cook-chill mode to introduce cool air to the cook-chill chamber during the decided operation time of the cook-chill mode by driving a cool air supplying means and a cool air amount control means, and stopping the operation of the cook-chill mode when the user orders an end command of the cook-chill mode or when the inner temperature of the cook-chill chamber goes below a lower-limit temperature.

2. The method for controlling a temperature of a cooked food chilling chamber in a refrigerator as claimed in claim 1, wherein in the step (iii) an operation of a refrigerating chamber is set to a quick refrigerating mode while the cook-chill mode is effective and is set to a general refrigerating mode when the cook-chill mode is stopped.

3. A method as claimed in claim 1, wherein in the step (ii) the measured load amount is compared to a reference load amount, a first time is determined as the operation time of the cook-chill mode when the measured load amount is larger than the reference load amount, a second time which is smaller than the first time is determined as the operation time of the cook-chill mode when the measured load amount is equal to the reference load amount, and a third time which is smaller than the second time is determined as the operation time of the cook-chill mode when the measured load amount is smaller than the reference load amount.

4. An apparatus for controlling a temperature of a cooked food chilling chamber in a refrigerator, said apparatus comprising:

key inputting means for producing an enable signal for a cook chill mode or a disable signal for the cook chill mode in response to an operation by a user;

means for supplying a cool air to a refrigerating compartment and a cook chill chamber in response to a first control signal;

means for controlling an amount of cool air supplied to the refrigerating compartment and the cook chill chamber in response to a second control signal;

means for periodically sensing an inside temperature of the cook chill chamber means for measuring a load amount of the cook chill chamber; and system control means for deciding whether a cook-chill mode is to be implemented or stopped based on an outputting signal of the key inputting means and a comparison of the sensed inside temperature with upper-limit and lower-limit temperatures, for determining an operation time of the cook-chill mode based on the measured load amount and a look-up-table which establishes data of the load amounts to the operation times of the cook-chill mode, where the operation time is proportional to the load amount, for controlling the cool air supplying means and the inside temperature sensing means to be driven during the operation time of the cook-chill mode by providing the first and second signals to the cool air supplying means and the inside temperature sensing means.

5. The apparatus for controlling a temperature of a cooked food chilling chamber in a refrigerator as claimed in claim 4, wherein said cool air supplying means comprises:

a compressor for compressing coolant;

a refrigerating fan for supplying the cool air to the refrigerating compartment and to the cook chill chamber; and a driving section for driving said compressor and said refrigerating fan in response to a control signal from said system control means.

6. The apparatus for controlling a temperature of a cooked food chilling chamber in a refrigerator as claimed in claim 4, wherein said cool air amount control means comprises:

a damper for controlling an opening and shutting rate of a cool air supplying passage supplying the cool air to the refrigerating compartment and to the cook chill chamber; and a damper driving section for driving said damper in response to a control signal from said system control means.

7. The apparatus for controlling a temperature of a cooked food chilling chamber in a refrigerator as claimed in claim 4, further comprising:

displaying means turning on when the cook chill mode starts and turning off when the cook chill mode stops whereby an operating state or a stopping state of the cook chill mode is displayed.

8. The apparatus for controlling a temperature of a cooked food chilling chamber in a refrigerator as claimed in claim 4, further comprising:

means for sensing a temperature inside of the refrigerating compartment and generating the sensed refrigerating compartment inside temperature signal.

9. The apparatus for controlling a temperature of a cooked food chilling chamber in a refrigerator as claimed in claim 8, wherein said system control means sets the refrigerating compartment to a quick refrigerating mode when the cook chill mode operates and sets the refrigerating compartment to a general refrigerating mode when the cook chill mode stops.

* * * * *